Figure 1:
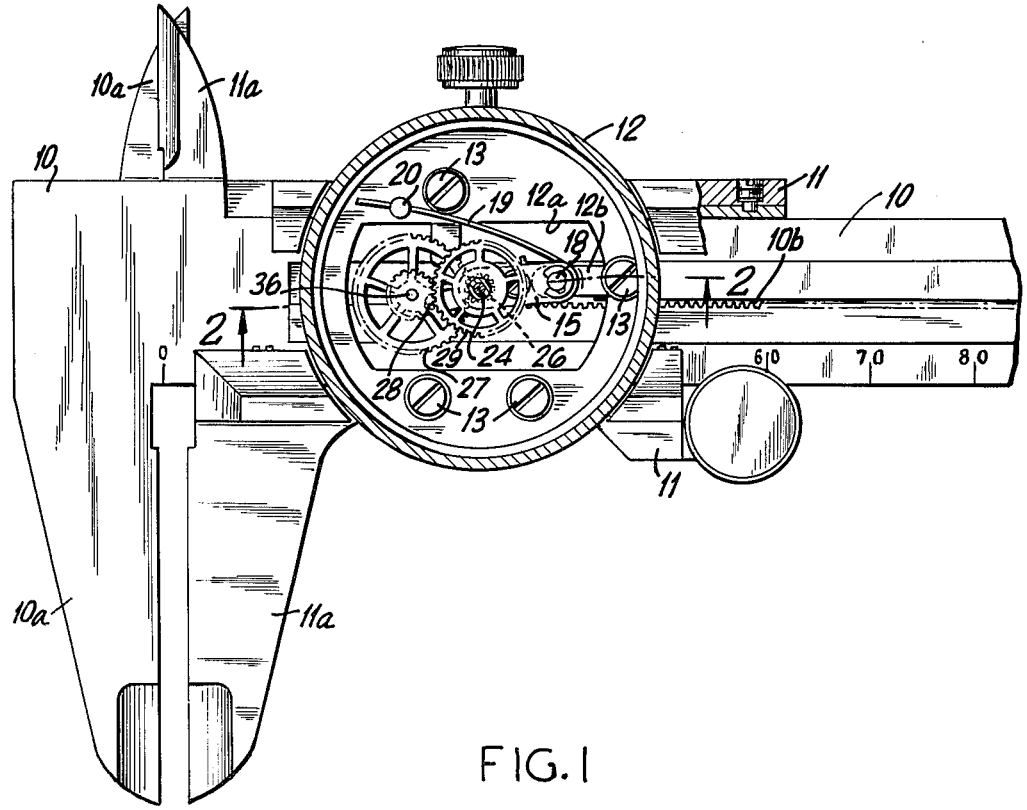

July 19, 1966　　　　　H. NEUMAYER　　　　　3,261,101
SLIDE CALIPER HAVING A DIAL INDICATOR
Filed Sept. 11, 1961　　　　　　　　　　　　3 Sheets-Sheet 1

INVENTOR.
HANS NEUMAYER
BY
ATTORNEY.

INVENTOR.
HANS NEUMAYER

BY *Benj. T. Rauber*

ATTORNEY.

July 19, 1966 H. NEUMAYER 3,261,101
SLIDE CALIPER HAVING A DIAL INDICATOR
Filed Sept. 11, 1961 3 Sheets-Sheet 3

INVENTOR.
HANS NEUMAYER
BY Benj. T. Rauber
ATTORNEY.

United States Patent Office 3,261,101
Patented July 19, 1966

3,261,101
SLIDE CALIPER HAVING A DIAL INDICATOR
Hans Neumayer, Oberndorf (Neckar), Germany, assignor to Messrs. Mauser-Messzeug G.m.b.H., Oberndorf (Neckar), Germany, a corporation of Germany
Filed Sept. 11, 1961, Ser. No. 137,460
Claims priority, application Germany, Sept. 10, 1960, M 46,535
2 Claims. (Cl. 33—147)

The invention relates to a vernier caliper in which a value, such as a dimension, is measured by means of a pair of sliding scales which slide relatively to each other in accordance with the distance from a zero point. An example of a vernier caliper heretofore known is one having a jaw fixed to one sliding member and another jaw fixed to the other sliding member one member having a graduated scale and the other having a datum mark movable along the scale as the jaws move apart from a closed or zero position. The second sliding member usually has a vernier scale extending from the datum mark. The marks of the graduated scale are graduated in hundredths of an inch, the vernier giving dimensions in thousandths of an inch or the graduated scale may be in millimeters and the vernier in tenths of a millimeter. The instrument of my present invention may, however, be used in sliding scales for the measurement of other values.

Owing to the close spacing of the graduated marks, the reading of the scales in the vernier calipers heretofore known is difficult and may, in some instances, be subject to error because of this difficulty. If a magnifying glass be set on a window riding over the graduated scale, this limits the field of observation to a small area, which is a disadvantage.

These disadvantages are obviated in my present invention in which the movement of one scale relative to the other is transferred to a dial having a pair of pointers rotatable over a pair of concentric circular graduations one pointer moving over a scale graduated in tenths of an inch and the other pointer moving over a circular graduation in hundredths of an inch and sub-divisions of a thousandth of an inch. Or, for metric measurements the graduations may be in centimeters, millimeters and tenths of a millimeter.

The dial and pointers, or hands, are mounted in a circular housing secured on one sliding member and carrying a pinion meshing with a rack on the other sliding member to rotate one complete revolution upon movement of the slides relative to each other a distance corresponding to a fixed value such as a centimeter. The pinion is fixed on a shaft which carries the pointer moving over the scale graduated in millimeters and tenths of a millimeter. A cylindrical shaft mounted concentrically with the shaft carrying the millimeter pointer is driven from the pinion through a reduction gearing having a ten or more to one ratio so that the cylindrical shaft makes one tenth of a complete revolution for each complete revolution of the pinion shaft. The cylindrical shaft carries a pointer rotating over a scale concentric with the scale graduated in millimeters, and graduated in centimeters. The graduations on the dial over which the pointers move may be made larger than the corresponding graduations on the slides and therefore more easily read and may be read in the same manner as the dial of a watch or clock.

Figure 2:
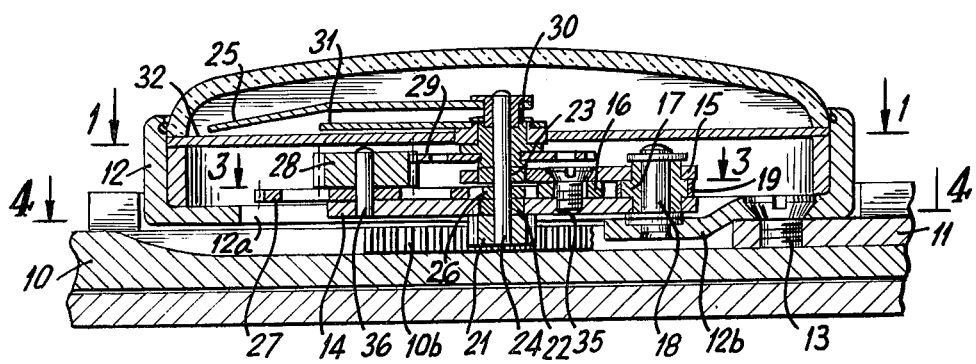
Figure 3:
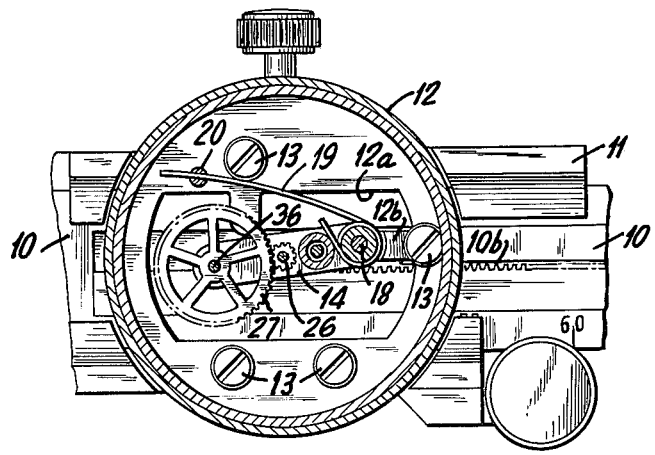
Figure 4:
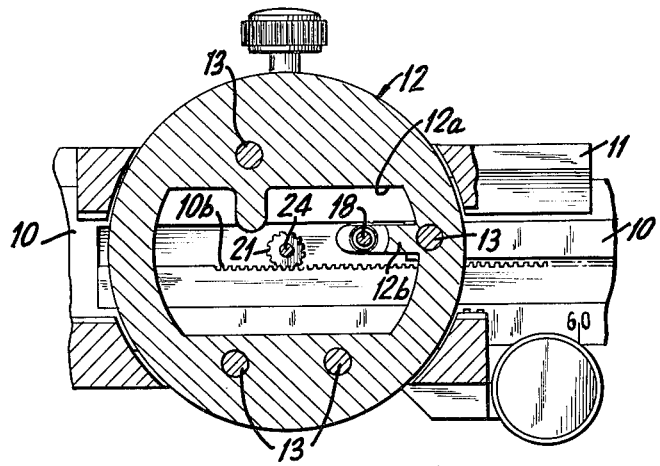
Figure 5:
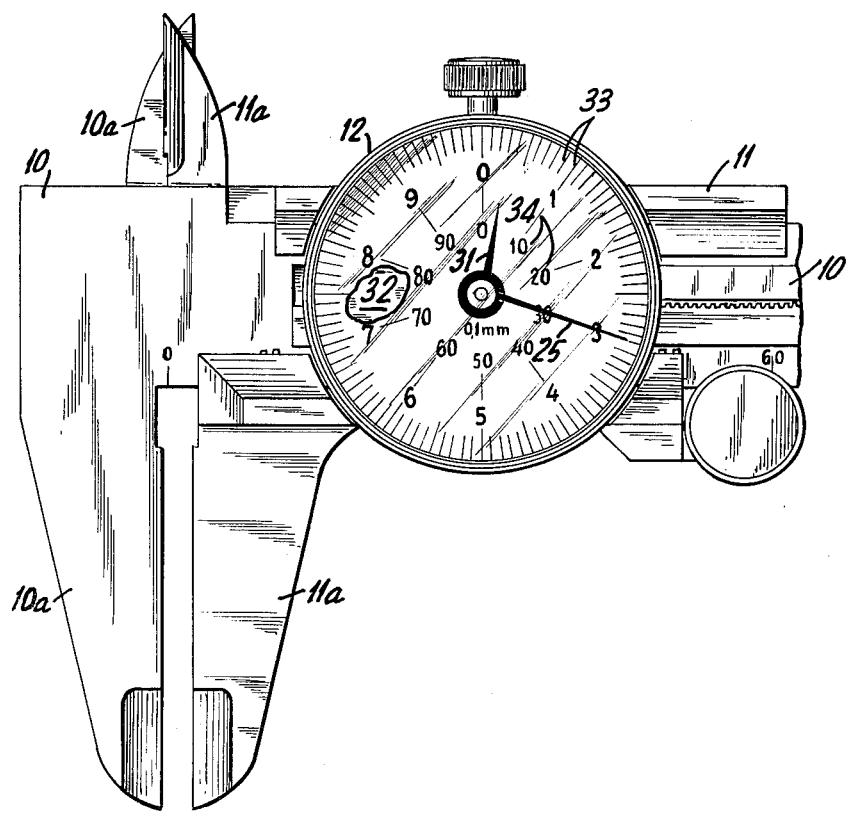

The various features of the invention are illustrated by way of example in the accompanying drawings, in which, FIG. 1 is a plan view of a sliding scale measuring instrument embodying the invention with the circular housing and mechanism therein being shown in section on the line 1—1 of FIG. 2, FIG. 2 is a section of the instrument taken on line 2—2 of FIG. 1,
FIG. 3 is a section taken on line 3—3 of FIG. 2,
FIG. 4 is a section taken on line 4—4 of FIG. 2, and,
FIG. 5 is a plan of the instrument.

The measuring instrument shown in the drawings comprises a slide supporting arm or element 10 having a jaw 10a and corresponding with the ruler or graduated element and a slide 11 having a jaw 11a and partly enclosing the element 10 and slidable longitudinally thereon. A housing 12 having an aperture 12a in its bottom wall is mounted in fixed position on the slide 11 by means of a screw 13. A bracket 12b extends from the side of the housing adjacent the screw 13 into and below the opening 12a to form a pivotal support for a pair of spaced bearing plates 14 and 15 which carry the pointer or hand actuating gear. The plates 14 and 15 are held in spaced positions by means of a sleeve 17 having a spacing collar and fitting at its ends into corresponding bores in the plates 14 and 15. The sleeve is pivotally held on the bracket by means of a rocker pin 18 rivetted on the bracket 12b and extending through the sleeve 17. A screw, not shown, holds the assembly together.

A pinion 21 is mounted on the end of a vernier or fine graduations spindle 24 which carries the pointer for the fine graduations and which extends below the lower plate 14 to carry the pinion. The pinion 21 meshes with a rack 10b on the element 10 and is rotated as the elements 10 and 11 slide longitudinally relatively to each other. The pitch circle of the pinion is of proper diameter to cause a revolution of the pinion for ten of the finest graduation spaces. The plates 14 and 15 are biased about the rocker pin 18 by a wire spring 19 one end of which is secured by a pin 20 in the bottom of the housing and which extends in turns about the sleeve 17 and thence into engagement with the plates 14 and 15 to hold the pinion 21 in meshing engagement with the rack 10b. Thus the tension biases the plates clockwise on the rocker pin 18 as viewed in FIG. 1.

The spindle 24 is rotatably mounted in jewel bearings 22 and 23, respectively mounted in the plates 14 and 15, and carries a vernier pointer or hand 25 above a dial 32 carrying graduations 33 divided into millimeters and tenths of millimeters or equivalent or similar graduations in inches. In the particular example shown a complete revolution of the spindle 24 and pointer or hand 25 will be equivalent to ten millimeters or one centimeter. A second pointer or hand 31 is rotated one revolution for 10 revolutions of the hand 25 over graduations 34 in the dial 32. The revolution of the pointer 31 is accomplished by gearing from the spindle 24.

This gearing comprises a gear 26 secured on the spindle 24 between the plates 14 and 15 which meshes with a gear 27 rotatably mounted on a trunnion 36 projecting upwardly from the plate 14. A gear 28 is fixed on the gear 27 to rotate therewith and meshes with a gear 29 fixed on a hollow shaft 30 rotatably mounted on the spindle 24 and projecting above the dial 32. The pointer or hand 31 is fixed on the upper end of the hollow shaft 30. The diameter of the pitch circle of the gear 27 is larger than that of the gear 26 and the pitch circle of the gear 29 is larger than that of the gear 28, the relations of the pitch circles being such as to give the desired step down in the rotation of the hand 31 relative to the hand 25.

In the above invention the dial graduations are not limited by the increments in the movement of one scale relative to another and thus may be made easily and accurately readable even though the measurements be made to the smallest gradations. In the positions of the hands in FIG. 5 with the hand 31 at less than 1 and the hand 25 at 30 tenths of a millimeter, the reading is 0.3 millimeter.

I claim:

1. A caliper comprising a slide supporting arm having rack teeth on one edge thereof and a jaw at one end, a slide slidably supported on said slide supporting arm and having a jaw complementary to the jaw on said arm, a pinion carried by said slide in position to engage said rack, a first pointer rotated by said pinion, a second pointer, a step-down gearing between said first pointer and said second pointer to rotate said second pointer at a reduced speed relative to that of said first pointer, a housing mounted on said slide and enclosing said pinion, gearing and dial, a bearing member carrying said pinion, gearing and pointers and pivoted in said housing off-center from the axis of said pinion, and a spring biasing said bearing member to hold said pinion in mesh with the rack teeth of said slide.

2. The caliper of claim 1 in which said bearing member comprises a pair of spaced plates normal to the axes of said pinion and gearing to receive said pinion and gearing between said plates and having bearings to carry said pinion and gearing.

References Cited by the Examiner
UNITED STATES PATENTS
2,581,128  1/1952  Mozur _____ 33—147 X LEONARD FORMAN, *Primary Examiner.*

ISAAC LISANN, ROBERT B. HULL, *Examiners.*

C. T. WOOD, *Assistant Examiner.*